United States Patent
Miyazaki et al.

(10) Patent No.: US 7,317,747 B2
(45) Date of Patent: Jan. 8, 2008

(54) TRANSMITTER AND RECEIVER

(75) Inventors: Noriaki Miyazaki, Yokosuka (JP); Toshinori Suzuki, Tokyo (JP)

(73) Assignee: KDDI Corporation, Tokyo (JP)

( * ) Notice: Subject to any disclaimer, the term of this patent is extended or adjusted under 35 U.S.C. 154(b) by 689 days.

(21) Appl. No.: 10/780,591

(22) Filed: Feb. 17, 2004

(65) Prior Publication Data
US 2004/0165650 A1     Aug. 26, 2004

(30) Foreign Application Priority Data
Feb. 18, 2003   (JP)   ............................. 2003-039894

(51) Int. Cl.
*H04L 27/00* (2006.01)
(52) U.S. Cl. ..................... 375/136; 375/135; 375/146; 375/147; 375/148; 375/295; 375/299; 375/347; 375/349
(58) Field of Classification Search ................ 375/349, 375/240.19, 295, 148, 299, 136, 144, 147, 375/206; 370/442, 249; 340/572.7, 505; 455/137; 725/118
See application file for complete search history.

(56) References Cited

U.S. PATENT DOCUMENTS

| | | | |
|---|---|---|---|
| 6,510,173 B1 * | 1/2003 | Garmonov et al. | 375/141 |
| 6,532,256 B2 * | 3/2003 | Miller | 375/222 |
| 6,633,614 B1 * | 10/2003 | Barton et al. | 375/264 |
| 6,665,308 B1 * | 12/2003 | Rakib et al. | 370/441 |
| 7,082,174 B1 * | 7/2006 | Smee et al. | 375/349 |
| 2002/0115473 A1 * | 8/2002 | Hwang et al. | 455/562 |
| 2004/0121809 A1 * | 6/2004 | Wallace et al. | 455/562.1 |
| 2006/0007989 A1 * | 1/2006 | Chen et al. | 375/146 |

FOREIGN PATENT DOCUMENTS

JP     2001-024557     1/2001

OTHER PUBLICATIONS

Youichi Satoh, "Modulation and De-modulation in Digital Wireless Communication," *Electronic Information Communication Society*, pp. 157-158 and 202-204 (1996).

(Continued)

*Primary Examiner*—Shuwang Liu
*Assistant Examiner*—Kabir A Timory
(74) *Attorney, Agent, or Firm*—David G. Conlin; Steven M. Jensen; Edwards Angell Palmer & Dodge LLP

(57) ABSTRACT

A receiver informs a delay profile and CIR measured in an FDE or a Rake receiver, together with a bit error rate of a received signal that is required in a receiver, as quality information to a transmitter. In the transmitter, based on the delay profile and CIR contained in the notified quality information, a number of code division multiplex and a frame format are decided in a decision circuit such that a bit error rate of a received signal, which is necessary on the receiver side, can be obtained. In addition, a transmission selection switch selects one of a unique word insertion unit and a cyclic prefix insertion unit that create a frame format for FDE reception and a pilot insertion unit and a complex scrambling unit that create a frame format for Rake reception, and data is then transmitted.

9 Claims, 10 Drawing Sheets

OTHER PUBLICATIONS

Shuuichi Sasaoka, "Mobile Communication," *Orm*, pp. 36-37 (1998).

Mitsuo Yokoyama, "Spread Spectrum Communication Systems," *Science Technology Publishing*, pp. 200-203, 401-403, and 523-538 (1998).

D. Falconer et al., "Frequency Domain Equalization for Single-Carrier Broadband Wireless Systems," *IEEE Comm. Mag.* vol. 40, No. 4, pp. 58-66 (Apr. 2002).

"3G Wireless Technology Workshop Part TIA/EIA-95 CDMA, cdma2000, HDR," shown in http://cp.literature.agilent.com/litweb/pdf/5988-3484JA.pdf, pp. 29-34 (Jan. 2001).

Andreas Czylwik, "Low Overhead Pilot-Aided Synchronization for Single Carrier Modulation with Frequency Domain Equalization," *Proc. GLOBECOM '98*, pp. 2068-2073 (Nov. 1998).

\* cited by examiner

↓ PADDING WITH ZEROS

↓ FFT

TRANSMITTER AND RECEIVER

BACKGROUND OF THE INVENTION

Priority is claimed on Japanese Patent Application No. 2003-039894, filed Feb. 18, 2003, the content of which is incorporated herein by reference.

1. Field of the Invention

The present invention relates to a transmitter and a receiver that transmit and receive signals.

2. Description of Related Art

Mobile communication is fundamentally communication beyond the line of sight, and multipath channel is formed by reflection, diffraction, and scattered waves. Furthermore, when the delay time of each path is too large to be disregarded, a multipath channel having delay diffusion. In a multipath channel having delay diffusion, the channel behaves like a particular type of filter and, as a result, transmitted signals thereof receive frequency selective fading (see, for example, "Modulation and De-modulation in Digital Wireless Communication", by Youichi Satoh, published by the Electronic Information Communication Society 1996, pp. 157-158 and pp. 202-204, and "Mobile Communication", by Shuuichi Sasaoka, published by Orm 1998, pp. 36-37).

For example, an example of a typical method against frequency selective fading in mobile communication that uses a code division multiplexing (CDM) format is Rake combining. Rake combining is a type of diversity technology, and is a technology that performs diversity (i.e., implicit diversity) using inherence of the signals. A typical method of combining spread diffused signals is the maximal ratio combining (MRC) method. This method combines the received signals with not only compensating the phase distortion but also weighting in accordance with the level of reliability.

In a code division multiple access (CDMA) cellular system, which is a typical mobile communication system, firstly, transmitted signals are spread using inner code in order to increase throughput. In addition, spread signals are also spread using outer code in order to decrease intra-cell and inter-cell interference. Generally, the first spreading uses Walsh code in which the cross correlation is 0 as long as there is no phase difference. The second spreading uses PN code in which the cross correlation characteristic is sufficiently small even under phase difference. PN code has the cross correlation of $1/N_p$, where the length of PN code is $N_p$ (see, for example, "Spread Spectrum Communication Systems", by Mitsuo Yokoyama, published by Science and Technology Publishing on 1988, pp. 200-203, 401-403, and 523-538).

However, if Rake receiver receives the transmitted signals spread by inner and outer code, then because the cross correlation outer code is not 0, intersymbol interference (i.e., multipath interference) is generated. Furthermore, even if the cross correlation of the inner code is 0, multipath interference increases in proportion with the number of inner code multiplex. Specifically, under two Rayleigh paths with an equal average power channel, the signal to interference power ratio (SIR) when signals that have been spread using Walsh code for the inner code and PN spreading for the outer code are combined using maximal ratio combining at Rake receiver is shown by Formula (1) given below. From Formula (1) it can be seen that the interference power increases in proportion to the number of Walsh multiplex Mw.

$$SIR = \frac{P_1}{\frac{M_W}{N_W}P_2} + \frac{P_2}{\frac{M_W}{N_W}P_1} \qquad (1)$$

In Formula (1), $P_1$ and $P_2$ are power of each path, $N_W$ is the length of the Walsh code, and $M_W$ is the number of Walsh multiplex.

The increase of the number of the multiplexed code increases the interference power, so Rake combiner is not tolerant to multipath interference with high code multiplexing.

In contrast, orthogonal frequency division multiplexing (OFDM) is known as a multipath interference. Suppression technology OFDM is a multi-carrier transmission system in which sub-carriers are arranged such that the cross correlation between adjacent sub-carriers is 0. The multi-carrier transmission divides the entire bandwidth into narrow bandwidth sub-carriers and signals are transmitted in parallel. Therefore, the throughput in each sub-carrier is reduced and the symbol duration of cash sub-carrier is longer compared with single carrier transmissions. Accordingly, it is possible to make the symbol duration sufficiently longer than the impulse response of the channel, and to reduce the effects of frequency selectivity fading (see, for example, the aforementioned related document "Modulation and De-modulation in Digital Wireless Communication" and also "Frequency Domain Equalization for Single-Carrier Broadband Wireless Systems", by D. Falconer, S. L. Ariyavisitakul, A. Benyamin-Seeyar and B. Eidson, IEEE Commun. Mag. April 2002, Vol. 40, No. 4, pp. 58-66).

However, in the OFDM system, the peak to average power ratio (PAPR) is high in order to create a signal in a frequency domain. Therefore, the OFDM system reduced its capacity due to the non-linearity of the power amplifier. It has the additional problem that if the carrier frequency is offset by the multipath channel, then the performance is greatly deteriorated.

Therefore, in recent years, Single Carrier with Frequency Domain Equalization (SC-FDE) is proposed as a waveform equalization technology to overcome the problems in the OFDM system. Although the receiver block diagrams of the OFDM and SC-FDE are similar, SC-FDE receiver has an inverse Fourier transformation block and processing other than channel estimation and equalization is performed in a time region. Therefore, the high PAPR and the vulnerability to carrier frequency offset, which are the OFDM problem, can be obviated (see, for example, the aforementioned related documents and also "Frequency Domain Equalization for Single-Carrier Broadband Wireless Systems", by D. Falconer, S. L. Ariyavisitakul, A. Benyamin-Seeyar and B. Eidson, IEEE Commun. Mag. April 2002, Vol. 40, No. 4, pp. 58-66).

In mobile communication that uses a CDM system, for example, the number of Walsh multiplex $M_W$ is small, the diversity gain of Rake combiner are greater than deterioration caused by multipath interference. Therefore, the Rake combiner is better than SC-FDE with low code multiplexing. Specifically, a computer simulation result is shown in FIG. 10.

FIG. 10 shows PER of Rake combining and SC-FDE dependence of $E_b/N_0$ under two Rayleigh paths with an equal average power.

As is shown in FIG. 10, the multipath interference of Rake combiner increases by increasing the number of Walsh multiplex $M_W$. When the number of Walsh mutiplex $M_W$ is 8 or more, PER of SC-FDE is smaller than Rake combiner. However, when the number of Walsh multiplex $M_W$ is 4 or less, conversely, the PER characteristics of Rake combiner are better. This is because while Rake combiner combines the power of the each path to increase the desired signal.

Accordingly, when reliable communication is required than high throughput, SC-FDE performance is less advantageous than Rake combiner. Therefore, SC-FDE will be difficult to obtain a satisfactory communication quality.

In this way, in a transmitter and receiver of a conventional CDM system, it has been difficult for single receiving method to obtain a satisfactory communication quality for a variety of channel conditions.

Note that in the simulation shown in FIG. 10, as is shown in FIG. 3A, the frame structure of SC-FDE thereof is formed by unique words (UW), which are pilot signals, and by data. The UW is constant amplitude zero auto-correlation (CAZAC) sequence of 64 chips, and a cyclic prefix (CP) of 16 chips is inserted at the head of both the UW region and the data region. As is shown in part FIG. 3B, the frame structure of Rake combining thereof is formed by pilot signals and data signals, and the pilot signals are BPSK signals of 96 chips, which is "1".

Moreover, complex scrambling (for example, "3G Wireless Technology Workshop Part TIA/EIA-95 CDMA, cdma2000, HDR," pp. 29-34, January 2001) is not performed to the data of SC-FDE, and the channel estimation is ideal. In addition, minimum mean square error frequency domain equalization (shown, for example, in "Low Overhead Pilot-Aided Synchronization for Single Carrier Modulation with Frequency Domain Equalization", Proc. GLOBECOM '98, pp. 2068-2073, Sydney, Australia, November 1998) is performed. On the other hand, the data of Rake combining is transmitted after complex scrambling using complex PN code of 1024 chips.

TABLE 1 shows the remaining simulation parameters. Moreover, the simulation knows the arrival time of the each path, at the timing of the preceding wave. Rake receiver combines each path with maximal ratio combining.

TABLE 1

| Item | Contents |
|---|---|
| Modulation | QPSK |
| Spreading | 1, 4, 8, 16 multiplex by 16 array walsh code |
| Chip duration | 1/1.2288 [μsec] |
| Channel | Two rayleigh paths with equal average power |
| Maximum dropper frequency | 60 [Hz] |
| Delay time | 1 chip duration |

SUMMARY OF THE INVENTION

The present invention was conceived in view of the above problems and it is an object thereof to provide a transmitter and receiver for forming a communication system that can cope with the various transmission conditions that are demanded, and that enable a satisfactory communication quality demanded various transmission data rates.

In order to solve the above problems, the transmitter according to the first aspect of the present invention is a transmitter that transmits signals to a receiver, including: a first transmitting device (for example, the unique word insertion unit 4 and the cyclic prefix insertion unit 5 of the preferred embodiments) that transmits signals using a frame format that is formed by a first pilot signal in which an end portion of a known signal that has been matched in advance with the receiver is reproduced at a front of the signal, and by first transmitted binary data in which an end portion of the data is reproduced at a front of the data; a second transmitting device (for example, the pilot insertion unit 7 and the complex scrambling unit 8 of the preferred embodiments) that transmits a signal using a frame format formed by a second pilot signal formed by a known signal that has been matched in advance with the receiver, and by second transmitted binary data; and a selection device (for example, the transmission switch 3 of the preferred embodiments) that, when a signal is transmitted, selects one of the first transmitting device and the second transmitting device.

A transmitter having the above described structure is able to transmit signals using the optimum frame format such that a communication quality that satisfies a variety of required transmission conditions on the receiver can be obtained using: a first transmitting device that transmits signals using a frame format for FDE reception that is formed by a first pilot signal in which the end portion of a known signal that has been matched in advance with the receiver is reproduced at the front of the signal, and by first transmitted binary data in which an end portion of the data is reproduced at a front of the data; and a second transmitting device that transmits signal using a frame format for Rake reception formed by a second pilot signal formed by a known signal that has been matched in advance with the receiver, and by second transmitted binary data.

The second aspect of the transmitter according to the present invention is the transmitter according to the first aspect in which the transmitter is provided with a format information sharing device (for example, data reception using the Rake receiver 10, the Walsh demultiplexer 11, and the demodulator 12 of the second embodiment) that shares information relating to the frame format with the receiver, and wherein, based on the information relating to the frame format shared with the receiver, the selection device selects one of the first transmitting device and the second transmitting device.

A transmitter having the above described structure shares information relating to the frame formats desired by the receiver using the format information sharing device. As a result, based on the acquired information relating to the frame format, the selection device selects one of the first transmitting device and the second transmitting device, and it is possible to confirm with a receiver a frame format that enables a communication quality that satisfies a variety of required transmission conditions to be obtained.

The third aspect of the transmitter according to the present invention is the transmitter according to the first aspect in which the transmitter is provided with: a quality information sharing device (for example, data reception using the Rake receiver 10, the Walsh demultiplexer 11, and the demodulator 12 of the first embodiment) that shares quality information that relates to the quality of a signal with the receiver; and a multiplex number deciding device (for example, the decision circuit 13 of the present embodiment) that decides whether or not code division multiplexing is present for a transmitted signal and also a number of Walsh multiplex from the quality information shared with the receiver, wherein the selection device selects one of the first transmitting device and the second transmitting device using control information created in accordance with the decision as to whether or not code division multiplexing is present for a transmitted signal and also number of Walsh multiplex.

A transmitter having the above described structure shares quality information that relates to the quality of a signal desired by the receiver using the quality information sharing device, and a multiplex number deciding device decides whether or not code division multiplexing is present for a transmitted signal and also a number of Walsh multiplex from the acquired quality information. As a result, the selection device selects one of the first transmitting device and the second transmitting device, using control information created in accordance with the decision as to whether or not code division multiplexing is present and the number of Walsh multiplex. Consequently, it is possible to transmit a signal using the optimum frame format such that a communication quality that satisfies a variety of required transmission conditions can be obtained.

The fourth aspect of the transmitter according to the present invention is the transmitter according to the third aspect in which the transmitter is provided with a format information sharing device (for example, the modulator 1 and the Walsh multiplexer 2 of the first embodiment) that shares with the receiver information concerning the frame format that relates to the one of the first transmission device and the second transmission device that is selected.

A transmitter having the above described structure shares information that relates to the frame format with a receiver using the format information sharing device. As a result, the task of deciding the frame format on the receiver side can be omitted, and it is possible to confirm with the receiver a frame format that enables a communication quality that satisfies each of a variety of required transmission conditions to be obtained.

The fifth aspect of the transmitter according to the present invention is the transmitter according to any of the first through fourth aspects in which the first pilot signals are formed by constant amplitude zero auto-correlation (CAZAC) sequence signals.

A transmitter having the above described structure uses a signal in which the amplitude spectrum in the frequency domain is constant as a pilot signal. As a result, the process to standardize the wavelength spectrum in the channel estimation processing on the receiver side can be omitted, so that the calculation can be simplified.

The sixth aspect of the transmitter according to the present invention is the transmitter according to any of the third to fifth aspects in which the quality information includes a bit error rate of received signals, a delay profile of the received signals that is estimated in the receiver using the first pilot signals, and a ratio of carrier to interference power ratio of the received signals that is estimated in the receiver using the second pilot signals.

A transmitter having the above described structure decides an optimum frame format to satisfy a bit error rate of the received signals can be obtained from a delay profile of the received signals that is estimated on the receiver and from carrier to interference power ratio of the received signals. Consequently, it is possible to transmit and receive a signal using the optimum frame format between the transmitter and the receiver.

The seventh aspect of the present invention is a receiver that receives signals from the transmitter, including: a first receiving device (for example, the FDE 24 of the preferred embodiments) that receives signals by operating a frequency domain equalizer (FDE); a second receiving device (for example, the Rake receiver 25 of the preferred embodiments) that performs Rake reception of signals; and a selection device (for example, the reception selection switch 22 of the preferred embodiments) that selects one of the first receiving device and the second receiving device.

A receiver having the above described structure is able to receive signals by the optimum method such that a communication quality that satisfies each of a variety of required transmission conditions can be obtained using one of a first receiving device that receives signals by operating an FDE and a second receiving device that performs Rake reception of signals.

The eighth aspect of the receiver according to the present invention is the receiver according to the seventh aspect in which the receiver is provided with: a quality measuring device (for example, a device built into the FDE 24 and Rake receiver 25 of the preferred embodiments) that measures the quality of a received signal; a multiplex number deciding device (for example, the decision circuit 33 of the preferred embodiments) that decides whether or not code division multiplexing is present for a transmitted signal and also a number of Walsh multiplex from quality information relating to the quality of the signal; and a format information sharing device (for example, a data transmission using the modulator 28, the Walsh multiplexer 29, the pilot insertion unit 30, and the complex scrambling unit 31 of the second embodiment) that shares information relating to the frame format with the transmitter, wherein the selection device selects one of the first receiving device and the second receiving device using control information created in accordance with the decision as to whether or not code division multiplexing is present for a transmitted signal and also the number of Walsh multiplex, and wherein the format information sharing device shares with the transmitter information concerning the frame formats that relates to the one of the first transmission device and the second transmission device that is selected.

A receiver having the above described structure measures the quality of a signal received by the quality measuring device, and decides whether or not code division multiplexing is present for a received signal and also the number of Walsh multiplex from quality information relating to the quality of the received signal. In addition, the receiver shares information relating to the decided frame format with the transmitter, and the selection device selects one of the first receiving device and the second receiving device, using control information created in accordance with the decision as to whether or not code division multiplexing is present and the number of Walsh multiplex. Consequently, together with a transmitter, the receiver is able to transmit and receive a signal using the optimum frame format such that a communication quality that satisfies each of a variety of required transmission conditions can be obtained.

The ninth aspect of the receiver according to the present invention is the receiver according to the seventh aspect in which the receiver is provided with: a quality measuring device (for example, a device built into the FDE 24 and Rake receiver 25 of the preferred embodiments) that measures the quality of a received signal; a quality information sharing device (for example, a data transmission that uses the modulator 28, the Walsh multiplexer 29, the pilot insertion unit 30, and the complex scrambling unit 31 of the second embodiment) that shares quality information that relates to the quality of a signal with the transmitter; and a format information sharing device (for example, a data reception that uses the Walsh demultiplexer 26 and the demodulator 27 of the first embodiment) that shares information relating to the frame format with the transmitter wherein, the selection device selects one of the first receiving device and the second receiving device based on information relating to the frame format that is shared with the transmitter.

A receiver having the above described structure measures the quality of a signal received by the quality measuring device, and shares quality information that relates to the quality of a received signal with the transmitter using the quality information sharing device. In addition, the decision as to whether or not code division multiplexing is present for a transmitted signal and also the number of Walsh multiplex is decided in the transmitter. The receiver also shares information relating to the decided frame format of a signal with the transmitter using the format information sharing device, and the selection device selects one of the first receiving device and the second receiving device based on the acquired information relating to the frame format. Consequently, together with a transmitter, the receiver is able to transmit and receive a signal using the optimum frame format such that a communication quality that satisfies each of a variety of required transmission conditions can be obtained.

The tenth aspect of the receiver according to the present invention is the receiver according to the seventh aspect in which the receiver being provided with: a quality measuring device (for example, a device built into the FDE 24 and Rake receiver 25 of the preferred embodiments) that measures the quality of a received signal; a multiplex number deciding device (for example, the decision circuit 33 of the preferred embodiments) that decides whether or not code division multiplexing is present for a received signal and also a number of Walsh multiplex from quality information relating to the quality of the signal; and a quality information sharing device (for example, a data transmission that uses the modulator 28, the Walsh multiplexer 29, the pilot insertion unit 30, and the complex scrambling unit 31 of the second embodiment) that shares quality information that relates to the quality of a signal with the transmitter, wherein the selection device selects one of the first receiving device and the second receiving device using control information created in accordance with the decision as to whether or not code division multiplexing is present for a transmitted signal and also the number of Walsh multiplex.

A receiver having the above described structure measures the quality of a signal received by the quality measuring device, and decides whether or not code division multiplexing is present for a received signal and also the number of Walsh multiplex from quality information relating to the quality of the received signal. As a result, the selection device selects one of the first receiving device and the second receiving device, using control information created in accordance with the decision as to whether or not code division multiplexing is present and the number of Walsh multiplex. The receiver also shares quality information that relates to the quality of a received signal with the transmitter using the quality information sharing device. Accordingly, the decision as to whether or not code division multiplexing is present for a transmitted signal and also the number of Walsh multiplex is decided in the transmitter. Consequently, together with a transmitter, the receiver is able to transmit and receive a signal using the optimum frame format such that a communication quality that satisfies a variety of required transmission conditions can be obtained.

The eleventh aspect of the receiver according to the present invention is the receiver according to any of the eighth to tenth aspects in which the quality measuring device includes a unit that performs delay profile estimation of received signals using the first pilot signals, and a unit that estimates a carrier to interference power ratio of the received signals using the second pilot signals, and wherein the quality information includes a bit error rate of received signals, a delay profile that is estimated in the receiver from the received signals, and a carrier to interference power ratio.

A receiver having the above described structure decides the optimum frame format to satisfy the bit error rate of the received signals from an estimated delay profile of the received signals and from a carrier to interference power ratio of the received signals. Consequently, it is possible for the receiver together with the transmitter to transmit and receive a signal using the optimum frame format.

DETAILED DESCRIPTION OF THE INVENTION

Embodiments of the present invention will now be described with reference to the drawings.

First Embodiment

Figure 1:
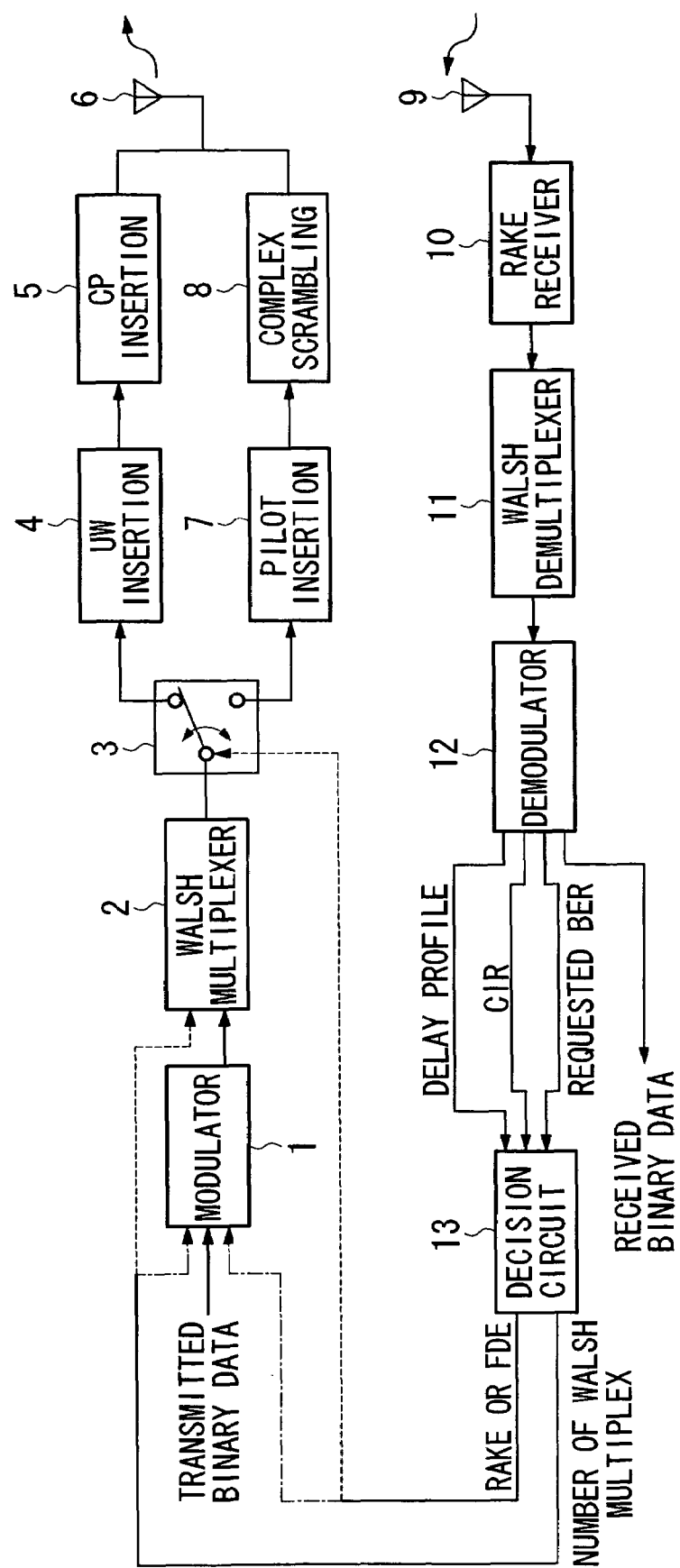
FIG. 1 is a block diagram showing the structure of a base station provided with the transmitter of the first embodiment of the present invention.
Figure 2:
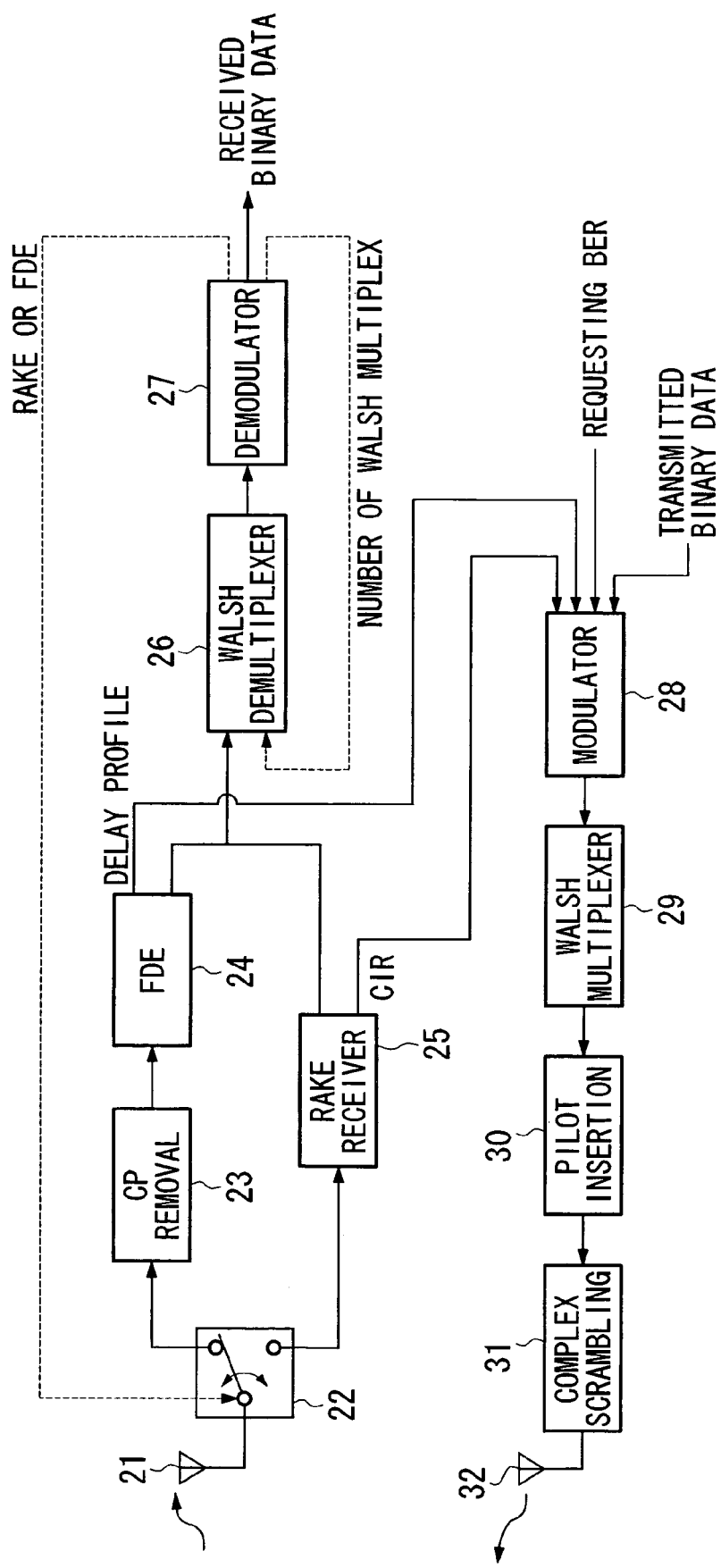
FIG. 2 is a block diagram showing the structure of a base station provided with the receiver of the first embodiment of the present invention.

FIGS. 1 and 2 are block diagrams showing examples when the transmitter and receiver of the first embodiment of the present invention are applied to the wireless communication of a down link between a base station and a mobile unit. FIG. 1 is a block diagram showing the structure of a base station provided with the transmitter of the present embodiment, while FIG. 2 is a block diagram showing the structure of a mobile unit provided with the receiver of the present embodiment.

Firstly, the base station provided with the transmitter of the present embodiment will be described using FIG. 1.

(Base Station Transmitter)

In FIG. 1, a modulator 1 indicates transmitted binary data and control signals and the like that are transmitted from a base station to a mobile unit. Output signals from the modulator 1 are input into a Walsh multiplexer 2. The Walsh multiplexer 2 multiplexes signals using code division multiplexing based on Walsh code in accordance with a transmission rate of transmitted binary data sent from the base station to the mobile unit, and secures the required transmission rate. The Walsh multiplexer 2 is also able to spread input signals and output them without code division multiplexing. The Walsh multiplexer 2 is also able to output input signals without spreading them.

Output signals from the Walsh multiplexer 2 are selected in two directions by a transmission selection switch 3. Specifically, one of the selection outputs of the transmission selection switch 3 is input into a UW insertion unit 4. In the UW insertion unit 4, as is shown in FIG. 3A, for example, in a frame formed by signals of 1024 chips per frame, a unique word (UW) of 64 chips as a pilot signal is inserted in front of the data.

Signals of a constant amplitude zero auto-correlation (CAZAC) sequence, for example, are used in the unique word. Chu sequence and Frank-Zadoff sequence are representative of CAZAC sequence, and these sequences have the characteristic that the amplitude spectrum thereof in the frequency domain is fixed.

Output signals of the UW insertion unit 4 are input into a CP insertion unit 5. A cyclic prefix (CP) is a signal in which the tail portion of the signal is reproduced at the front of the signal. A cyclic prefix is inserted in order to provide a guard time to prevent a non-continuous received signal by a multipath channel.

Figure 3:
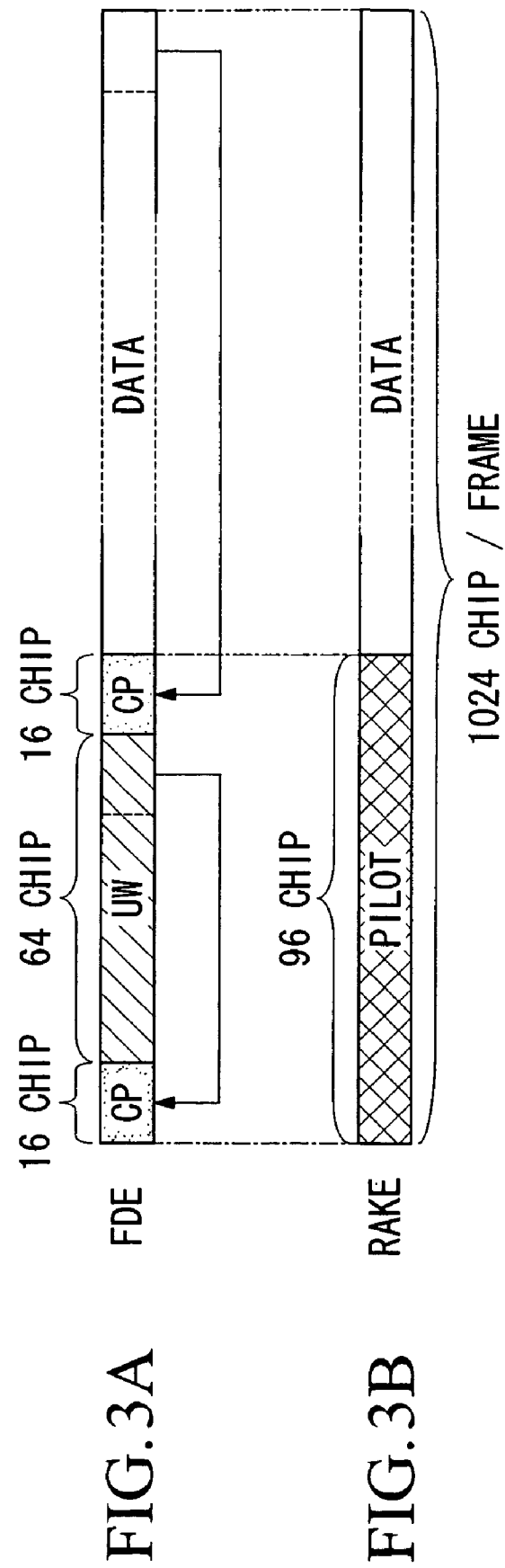
FIGS. 3A and 3B are views showing a frame format when an FDE is used and a frame format when Rake reception is used.

Specifically, in the CP insertion unit 5, as is shown, for example, in FIG. 3A, the signals at the end portions of both the data and UW are copied at the front of both the data and UW.

Moreover, in the UW insertion unit 4 and CP insertion unit 5, signals in which the UW and CP have been inserted are sent from the transmission antenna 6 to the mobile unit.

The other output of the transmission selection switch 3 is input into a pilot insertion unit 7. The pilot signals inserted here are known signals that have been previously matched between the transmitter and receiver, and that are inserted in transmitted signals in order to perform channel estimation when Rake reception is performed on the mobile unit.

Specifically, in the pilot insertion unit 7, for example, as is shown in FIG. 3B, in a frame formed by signals of 1024 chips per frame, 96 chips of BPSK in which the data is all 1 are inserted at the front of the data. Output signals of the pilot insertion unit 7 are input into a complex scrambling unit 8.

In the complex scrambling unit 8, as was shown in, for example, "3G Wireless Technology Workshop Part 2 TIA/EIA-95 CDMA, cdma2000, HDR", shown in http://cp.literature.agilent.com/litweb/pdf/5988-3484JA.pdf, pp. 29-34, January 2001, scrambling at a scrambling ratio of 1 is performed using previously determined complex PN code.

Pilot signals are inserted in the pilot insertion unit 7, and signals scrambling in the complex scrambling unit 8 are transmitted from the transmission antenna 6 to the mobile unit.

Note that, when transmitting signals, the transmission selection switch 3 selects whether to transmit data via the UW insertion unit 4 and the CP insertion unit 5 or whether to transmit via the pilot insertion unit 7 and the complex scrambling unit 8. An operation of the selection switch 3 is described below.

(Base Station Receiver)

Signals transmitted from the mobile unit are received by the receiving antenna 9 and are input into a Rake receiver 10. The Rake receiver 10 is a diversity receiver that de-scrambling the received signals using complex PN code that has been used on the mobile unit, and also combines signal powers that have been scattered by multipath channel using maximal ratio combining. Note that the Rake receiver 10 is described in detail below.

Output signals of the Rake receiver 10 are input into a Walsh demultiplexer 11. The Walsh demultiplexer 11 disassembles code division multiplexed signals using Walsh code applied on the mobile unit and extracts signals therefrom. Output signals from the Walsh demultiplexer 11 are input into a demodulator 12. The demodulator 12 is a demodulator that extracts data and control signals sent from the mobile unit to the base station. For example, received binary data, delay profiles and carrier to interference power ratios that are measured on the mobile unit, as well as requesting BER of received signals that is required in the mobile unit that are transmitted from the mobile unit to the base station.

Furthermore, a decision circuit 13 is provided with a mapping circuit that decides whether or not code division multiplexing is present for transmitted signals and also the number of Walsh multiplex using the delay profile and CIR extracted by the demodulator 12, and also using the requesting BER required by the receiver that are sent from the mobile unit to the base station. Based on the existence or otherwise of code division multiplexing and on the number of Walsh multiplex that are decided, the decision circuit 13 then decides direction of the selection switch 13, decides the information relating to the frame format that shows the frame format (Rake or FDE).

Figure 10:
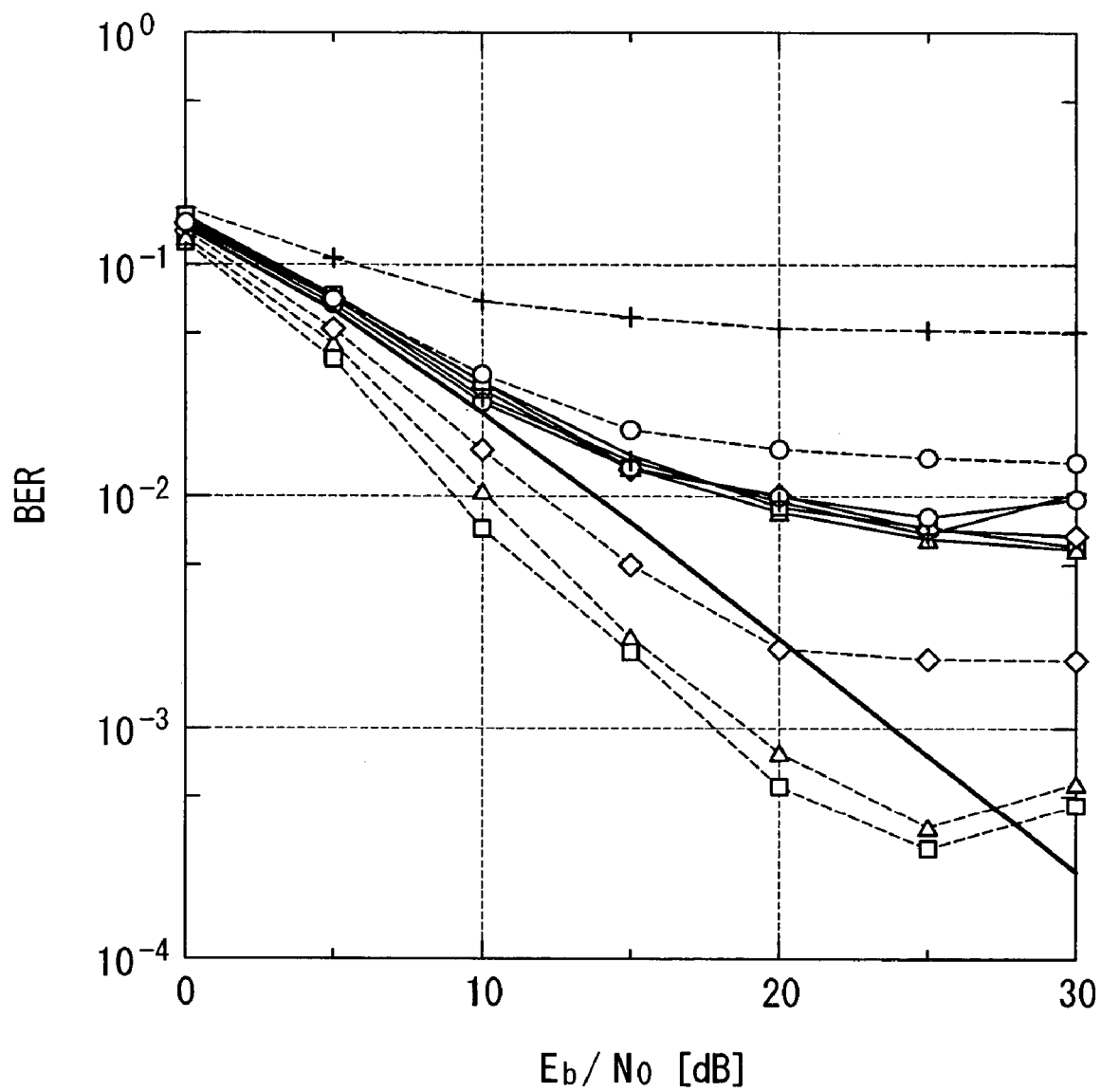
FIG. 10 is a graph showing a comparison of BER characteristics relative to $E_b/N_0$ for Rake reception and FDE reception taking the number of Walsh multiplex $M_W$ as a parameter.

An example of the method of deciding whether or not code division multiplexing is present in transmitted signals and the number of Walsh multiplex, and also deciding the frame format by the decision circuit 13 will be described. From the aforementioned simulation results shown in FIG. 10, it can be confirmed that, the multipath interference of Rake receiver increases by increasing the number of Walsh multiplex $M_W$, so BER deteriorates with high code multiplex. It was also found that when the number of Walsh multiplex $M_W$ was 8 or more, FDE had better characteristics, while when the number of Walsh multiplex $M_W$ was 4 or less, conversely, Rake receiver had better characteristics. It was also found that the same BER of FDE were obtained regardless of the number of Walsh multiplex $M_W$.

When high data rate transmission is required and the multiplex number that FDE has better characteristics than Rake combiner is required, it is sufficient to transmit data using a frame format that can be received by FDE without code division multiplexing. In this case, the direction of the transmission selection switch 3 is set to the UW insertion unit 4 side. When high quality information transmission is desired even if the low data rate transmission is used, then it is sufficient to transmit data using a frame format that can be received by Rake combiner with the appropriate number of code division multiplex. In this case, the direction of the transmission selection switch 3 is set to the pilot insertion unit 7 side.

Note that, the data of the plural users is transmitted simultaneously in a frame format that can be received by FDE, it is also possible to superimposed the data using code division multiplexing.

Next, the mobile unit provided with the receiver of the present embodiment will be described using FIG. 2.

(Mobile Unit Receiver)

In FIG. 2, signals received from the receiving antenna 21 are selectively output in two directions by the reception selection switch 22. Specifically, one selection output of the reception selection switch 22 is input into a cyclic prefix (CP) removal unit 23. In the CP removal unit 23, in the frame format shown in FIG. 3A, portions corresponding to the cyclic prefixes of the data and the unique word are removed from the received signals.

Next, output signals of the CP removal unit 23 are input into a frequency domain equalizer (FDE) 24, and the received signals is equalized in a frequency domain. The FDE 24 performs waveform equalization of signals deteriorated by multipath channel, and is also able to measure delay profile. Note that the FDE 24 is described below in detail.

The other selection output of the reception selection switch 22 is input into a Rake receiver 25. The Rake receiver 25 is a diversity receiver of the same type as the Rake receiver 10 used in the base station. On the mobile unit side, CIR is calculated in the Rake receiver 25, which de-scrambles the received signals using complex PN code that has been used on the base station and combines signals by maximum ratio combining. Note that the operation of the reception selection switch 22 is described below. The Rake receiver 25 is also described below in detail.

Next, signals in which the signal deterioration generated by delay scattering of the transmission path has been compensated by the FDE 24 or by the Rake receiver 25 are input into a Walsh demultiplexer 26. In the same way as the Walsh demultiplexer 11 used in the base station, the Walsh demultiplexer 26 disassembles code division multiplexed signals using Walsh code applied on the base station and extracts signals therefrom. Output signals from the Walsh demultiplexer 26 are input into a demodulator 27.

In the same way as the demodulator 12, the demodulator 27 is a demodulator that extracts data and control signals superimposed on a carrier wave sent from the base station to the mobile unit. For example, received binary data, whether or not code division multiplexing is present in transmitted signals and also the number of Walsh multiplex that has been decided on the base station, as well as information relating to the frame format (Rake or FDE) that is decided based on the decision as to whether or not code division multiplexing is present in transmitted signals and also the number of Walsh multiplex, that have each been transmitted from the base station to the mobile unit side are extracted.

Note that when the information relating to the frame format demodulated by the demodulator 27 indicates FDE, the direction of the reception selection switch 22 is set to the CP removal unit 23 side. On the other hand, if it indicates Rake reception, the direction of the reception selection switch 22 is set to the Rake receiver 10 side. The Walsh demultiplexer 26 disassembles code division multiplexed data based on whether or not code division multiplexing is present and also the number of Walsh multiplex, which has been demodulated by the demodulator 27, and extracts signals therefrom.

(Mobile Unit Transmitter)

In the same way as the modulator 1 used in the base station, a modulator 28 modulates transmitted binary data sent from the mobile unit to the base station, delay profiles and CIR measured on the mobile unit side, and also requesting BER of received signals that is required in the mobile unit. Output signals from the modulator 28 are input into a Walsh multiplexer 29.

In the same way as the Walsh multiplexer 2 used in the base station, the Walsh multiplexer 29 multiplexes signals using code division multiplexing based on Walsh code in accordance with a transmission rate of transmitted binary data sent from the mobile unit to the base station, and secures the required transmission rate. Output signals from the Walsh multiplexer 29 are input into a pilot insertion unit 30 and, in the same way as in the pilot insertion unit 7 used in the base station, pilot signals, which are known signals that have been previously matched between the transmitter and receiver, are inserted such that channel estimation can be performed when Rake reception is performed on the base station.

Output signals of the pilot insertion unit 30 are input into a complex scrambling unit 31 and, in the same way as in the complex scrambling unit 8 used in the base station, scrambling at a scrambling ratio of 1 is performed using previously determined complex PN code. Next, pilot signals are inserted in the pilot insertion unit 30, and signal scrambled in the complex scrambling unit 31 are transmitted from the transmission antenna 32 to the base station.

(Rake Receiver)

Figure 4:
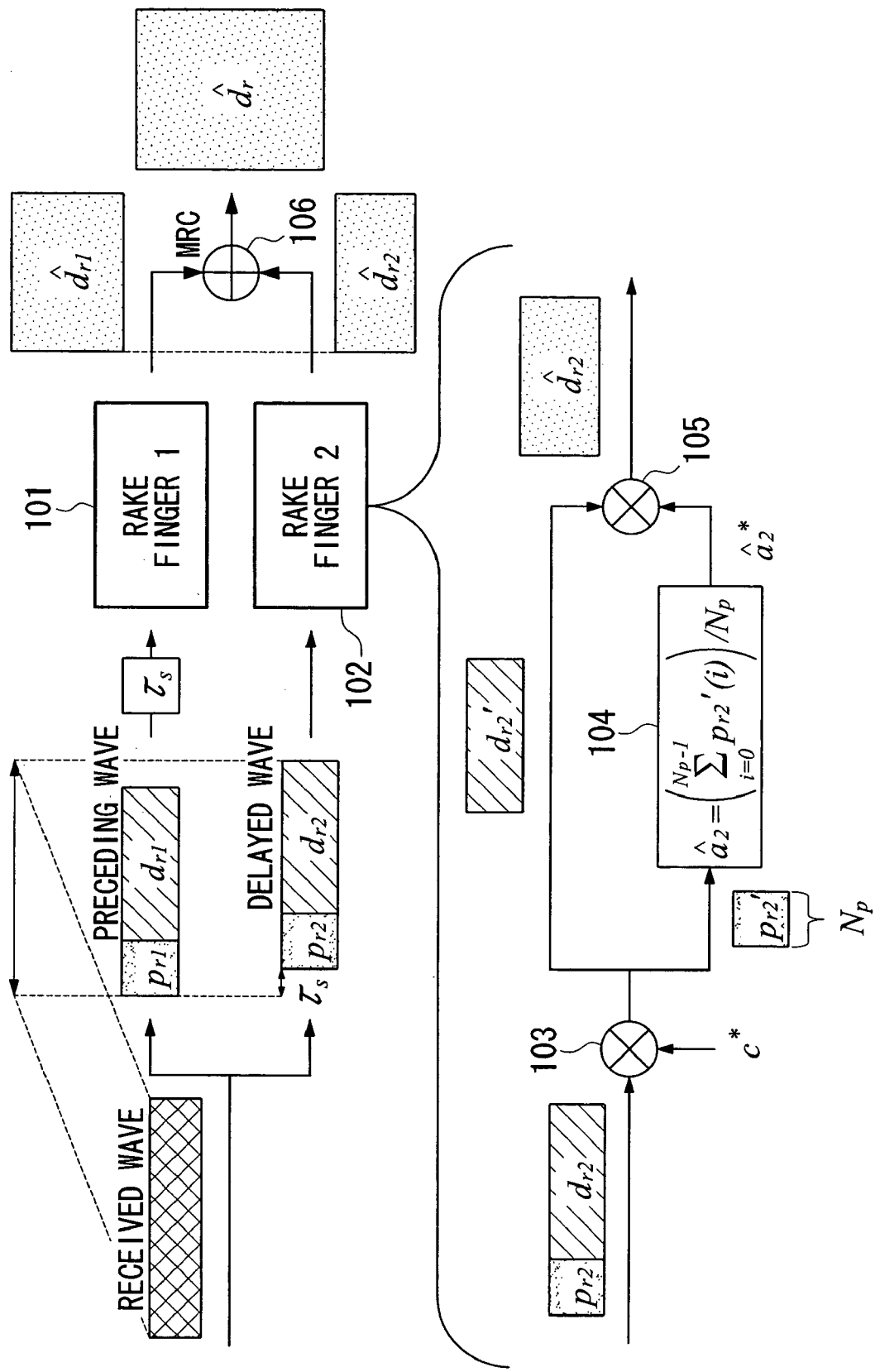
FIG. 4 is a block diagram showing the structure of a Rake receiver used in a base station and in a mobile unit.

Next, the Rake receiver 10 and the rake receiver 25 used in the above described base station and mobile unit will be described below in detail. Note that the Rake receiver 10 and the Rake receiver 25 have the same structure, and this structure is shown in FIG. 4. FIG. 4 shows an example in which a Rake receiver receives a multipath signal formed by a preceding wave (i.e., a main wave) and a delay wave (i.e., formed by two waves).

TABLE 2 shows the contents of the respective symbols shown in FIG. 4.

TABLE 2

| Symbol | Meaning |
| --- | --- |
| $p_{r1}$ | Received pilot chip of preceding wave |
| $p_{r2}$ | Received pilot chip of delayed wave |
| $d_{r1}$ | Received pilot chip of preceding wave |
| $d_{r2}$ | Received pilot chip of delayed wave |
| $\hat{d}_{r1}$ | Weighted $d_{r1}$ |
| $\hat{d}_{r2}$ | Weighted $d_{r2}$ |
| $\hat{d}_r$ | Maximum ratio combined data chip |
| $p_{r2}'$ | De-spread $p_{r2}$ |
| $d_{r2}'$ | De-spread $d_{r2}$ |
| $\tau_s$ | delay time |
| $N_p$ | Number of pilot chips |
| $\hat{a}2$ | Estimated channel of delayed wave |

In FIG. 4, when a preceding wave and a delay wave are included in a received wave, firstly, the preceding wave is delayed by a delay time $\tau_s$ the difference of received time between the preceding wave and the delay wave, and is then input into a rake finger A 101. The delay wave, on the other hand, is directly input into a Rake finger B 102.

A rake finger is a de-spreader that performs phase control and weighting using estimated channel measured using the pilot signal in a received signal, and the Rake finger A 101 and the Rake finger B 102 circuits have the same structure.

The Rake finger B 102 will be described as a typical example. A received pilot chip of a delayed wave $p_{r2}$ and a received data chip of a delayed wave $d_{r2}$, is de-spread in an de-spreader 103 using a complex conjugated signal c* of a spreading code c used in the transmitter. The received pilot chip $p_{r2}$ is input into a weighting coefficient calculator 104. Note that in the present embodiment the spreading code c is the complex PN code used in the complex scrambling unit 31 or in the complex scrambling unit 8 in the transmitter.

In the weighting coefficient calculator 104, a calculation shown in Formula (2) below is performed where a number of pilot chips $N_p$. An average value of a De-spread signal $p_{r2}'$ of the received pilot chip $p_{r2}$ represented by a complex number is determined as an estimated channel of a delayed wave "$a_2$ hat". In a coefficient multiplier 105, a complex conjugated number of the estimated channels "$a_2^*$ hat" is multiplied by the De-spread signal $d_{r2}'$ of the received data $d_{r2}$, and a weighted data $d_{r2}$ "$d_{r2}$ hat" is determined.

$$\hat{a}_2 = \left( \sum_{i=0}^{N_p-1} p_{r_2}'(i) \right) / N_p \tag{2}$$

In the same way, in the Rake finger A 101, a weighted data $d_{r1}$ "$d_{r1}$ hat" is determined from the received pilot chip of the preceding wave $p_{r1}$ and the received data chip of the preceding wave $d_{r1}$, and by combining the "$d_{r1}$ hat" and the "$d_{r2}$ hat" in an adder 106, a maximal ratio combined data chip "$d_r$ hat" is determined and is output from the Rake receiver.

(FDE)

Figure 5:
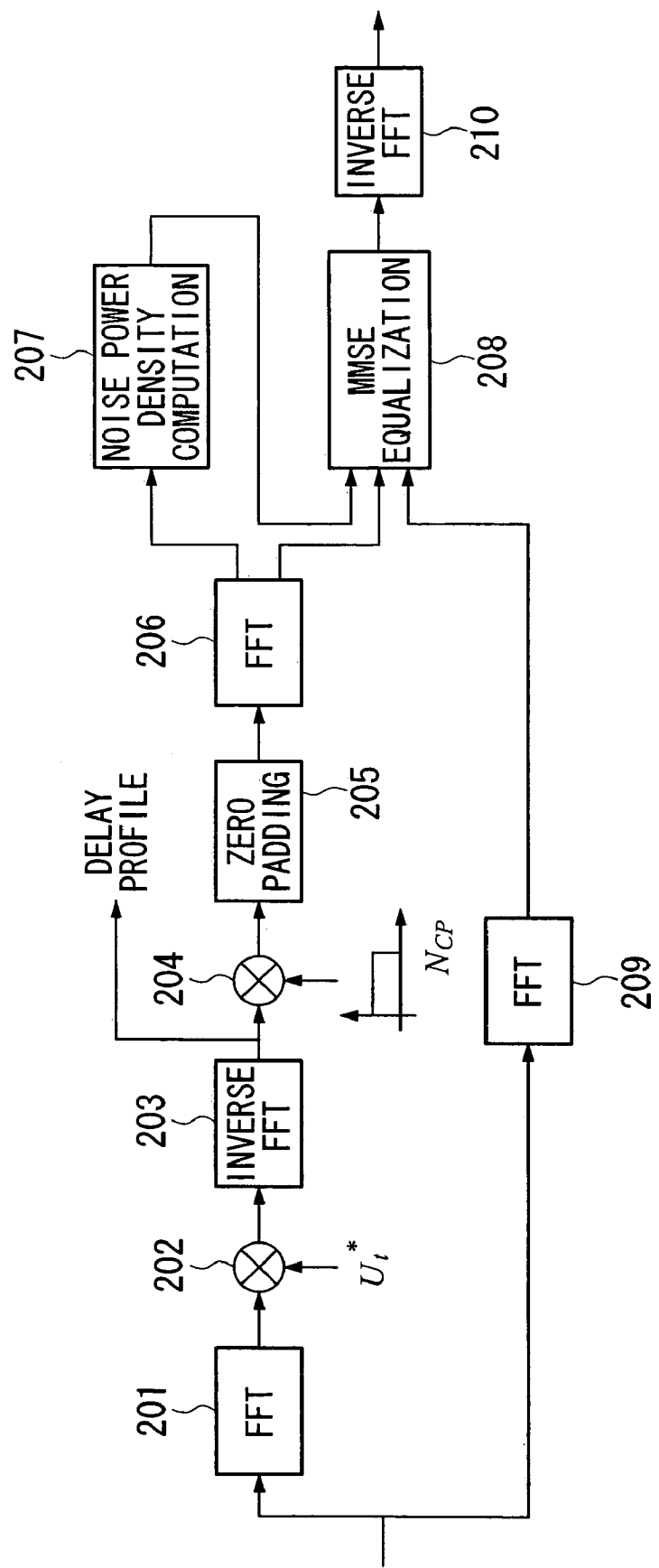
FIG. 5 is a block diagram showing the structure of an FDE used in a mobile unit.

The FDE 24 used in the above described mobile unit will now be described in detail. FIG. 5 is a block diagram showing the structure of an FDE that is provided in the above described mobile unit, and shows an example in which MMSEC algorithm is used for the frequency domain equalization method. Note that, channel estimation on the frequency domain uses the characteristic that the amplitude spectrum of a unique word is constant over the entire frequency.

Where a Fourier transformed transmitted unique word symbol is $U_t$, a received unique word symbol is $U_r$, and the length of a unique word is $N_U$, then using Formula (3) below, the estimated channel in the frequency domain "$H_{est}$" is calculated.

$$H_{est} = \frac{U_r \cdot U_t^*}{N_U} \tag{3}$$

In Formula 3, $U_t^*$ represents a complex conjugated symbol of $U_t$.

Since the estimated channel includes noise components, it, it is necessary to remove the effects of the noise.

Figure 6A:
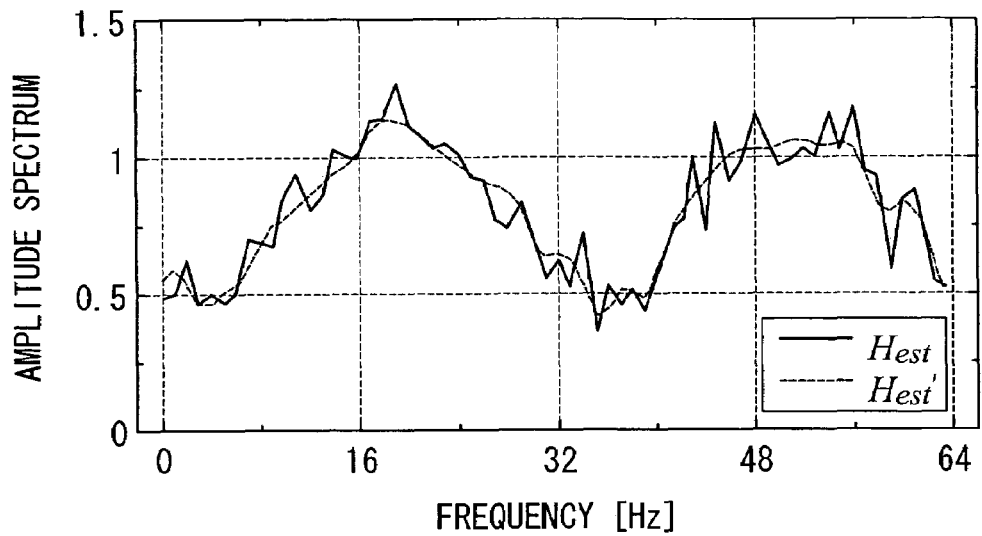
FIGS. 6A and 6B are views showing the course of a noise removal process in FDE.
Figure 6B:
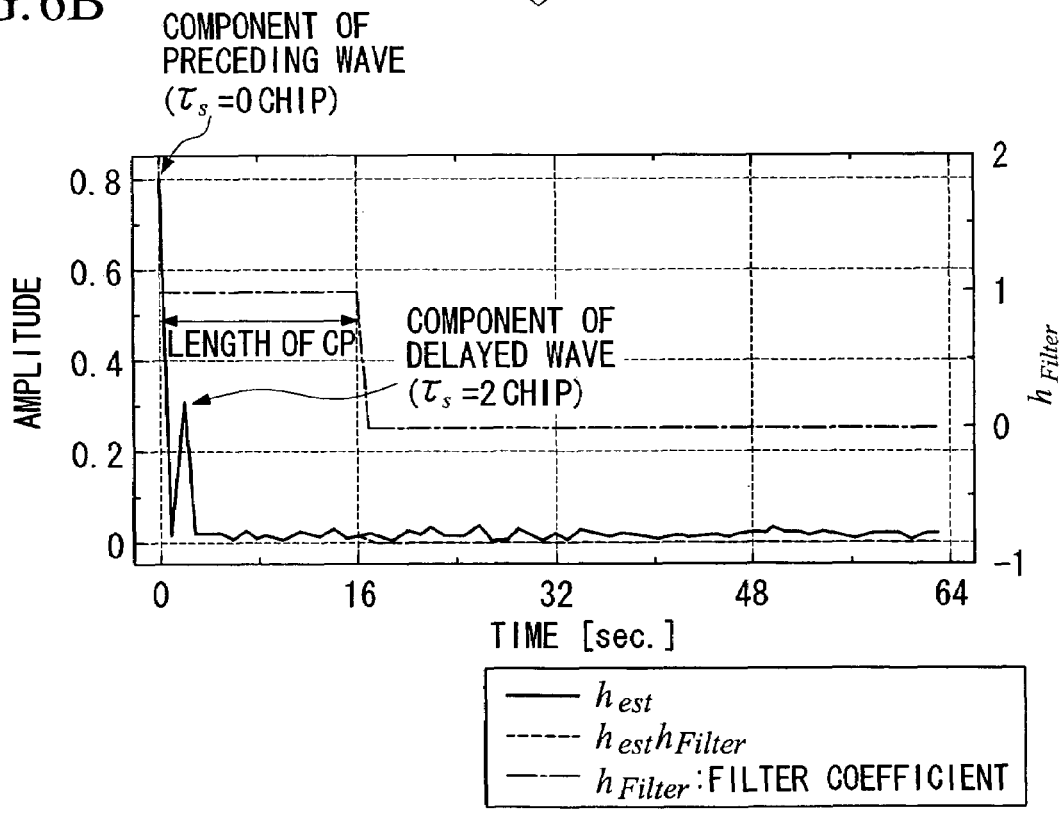

A detailed description of the procedure of a noise removal process will now be given under two Rayleigh path with an equal average power. Where the delay time $\tau_s$ is two chips, the length of the unique word is 64 chips, and the cyclic prefix is 16 chips. FIG. 6 shows the noise removal process. In FIG. 6A, the horizontal axis is the frequency and the vertical axis is the amplitude spectrum. FIG. 6A shows the estimated channel value $H_{est}$ and the estimated channel after noise removal $H_{est}'$. In contrast, in FIG. 6B, the horizontal axis is the time and the vertical axis is the amplitude. FIG. 6A shows $h_{est}$ that is obtained by performing inverse Fourier transformation on the estimated channel value $H_{est}$, and $h_{est}'$ that is obtained by performing inverse Fourier transformation on the estimated channel value $H_{est}'$ after noise removal, and a filter coefficient used in the noise removal.

Firstly, as is shown in FIG. 6A, a large number of noise components are contained in the estimated channel $H_{est}$. The $h_{est}$, which is obtained by performing an inverse Fourier transformation on the estimated channel value $H_{est}$, shows a delay profile of an estimated received signal. Moreover, as is shown in FIG. 6B, the delay profile $h_{est}$ under 2 Rayleigh paths with an equal average power includes both a component of a preceding wave, and a component of a delayed wave, and that the noise component spreads over the time region.

Because the length of the CP is set to be greater than the maximum delayed time of the channel, it can be considered that all components in a time region that is larger than the cyclic prefix are noise components. Accordingly, by multiplying the filter $h_{Filter}$ that extracts only components within the cyclic prefix by the delay profile $h_{est}$, it is possible to remove noise components in estimated channel $H_{est}$. Specifically, the estimated channel $H_{est}'$ after the noise removal can be determined using Formula (4) below.

$$H_{est}' = F\{h_{est} h_{FILTER}\} \tag{4}$$

In Formula (4), $F\{\alpha\}$ shows that a Fourier transformation is performed on $\alpha$.

As is shown in FIG. 6, the estimated channel $H_{est}'$ after the noise removal shown in FIG. 6A that is obtained by performing a Fourier transformation on a signal $h_{est} h_{Filter}$ that has been filtered using the filter $h_{Filter}$ shown in FIG. 6B is less affected by noise compared with estimated channel $H_{est}$.

When waveform equalization of the data is performed using the estimated channel $H_{est}'$, it is necessary to interpolate the estimated channel $H_{est}'$ in order to match the number of the data because the number of data is larger than unique word. FIG. 7 shows interpolation procedure of the estimated channel $H_{est}'$. Note that FIG. 7 shows a case in which, to simplify the explanation, the lengths of the unique word and of the data are each 64 and 128 chips respectively.

Figure 7A:
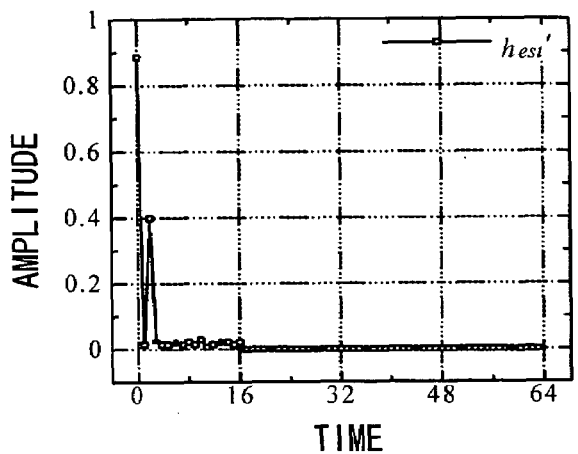
FIGS. 7A to 7C are views showing the process to interpolate estimated channel in FDE.
Figure 7B:
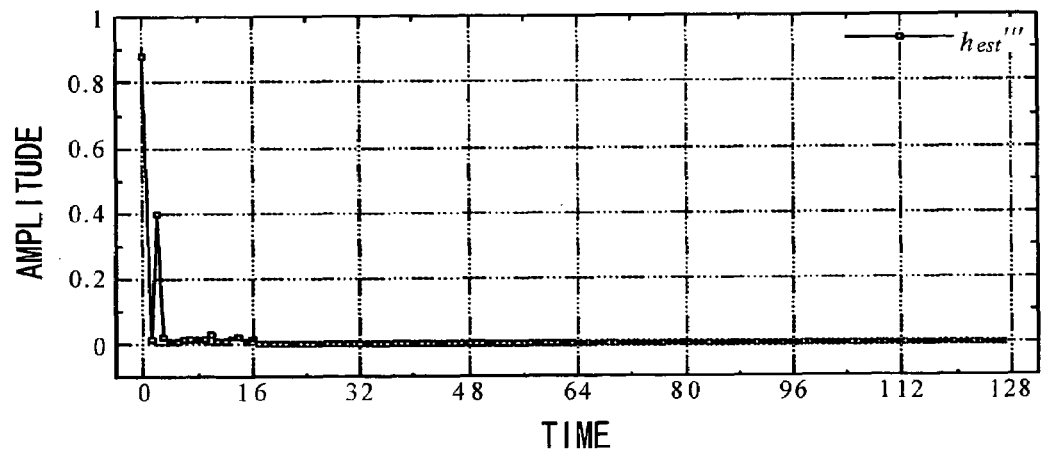

As is shown in FIG. 7A, by the above described noise removal process, a delay profile $h_{est}'$ of 64 chips is obtained, which does not have the data from 64 to 128 chips. As is shown in FIG. 7B, the interpolation area (i.e., from 64 chips to 128 chips) of the delay profile $h_{est}'$ is interpolated by padding with zeros so that a signal $h_{est}''$ is obtained.

Figure 7C:
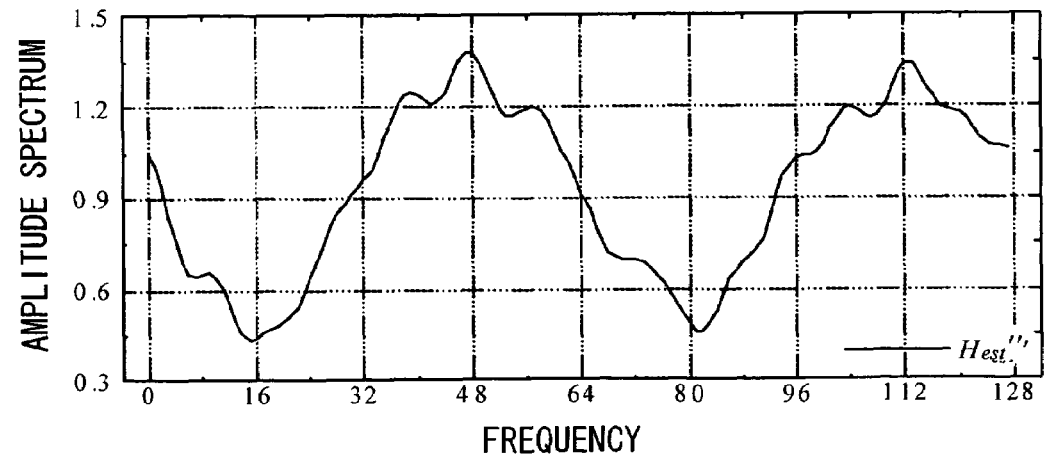

As is shown in FIG. 7C, by performing a Fourier transformation (FFT) on the obtained $h_{est}''$, interpolated estimated channel $H_{est}''$ is obtained. Note that, in FIGS. 7A and 7B, the horizontal axis is taken as time and the vertical axis is taken as amplitude, while in FIG. 7C, the horizontal axis is taken as frequency and the vertical axis is taken as amplitude spectrum.

MMSE frequency domain equalization is performed using the determined estimated channel $H_{est}''$. In this MMSE frequency domain equalization, it is necessary to determine the noise power from the estimated channel $H_{est}''$. Where the transmitted unique word after the Fourier transformation is $U_t(f)$, the received unique word is $U_r(f)$, the length of the unique word is $N_U$, and the estimated channel in the frequency domain is $H_{est}(f)''$, the noise power density $\Sigma^2$ in the frequency domain is determined using Formula (5) below.

$$\Sigma^2 = \frac{\sum_{f=0}^{N_U-1} \left| \frac{U_r(f)}{\sqrt{N_U}} - H_{est}(f) \frac{U_t(f)}{\sqrt{N_U}} \right|^2}{2N_U} \tag{5}$$

In Formula (5), f is the frequency and $0 \leq f \leq N_U$.

Because the estimated channel $H_{est}''$ is a estimated channel from which only the noise components in the time region larger than the cyclic prefix have been removed, the estimated noise power density is smaller by the amount of the noise component in the cyclic prefix because the noise component of the estimated channel $H_{est}''$ larger than the cyclic prefix has been removed. Accordingly, where the length of the cyclic prefix is $N_{CP}$, the noise power $(\Sigma')^2$ after interpolation is determined using Formula (6) below.

$$(\Sigma')^2 = \frac{N_U}{N_U - N_{CP}} \Sigma^2 \qquad (6)$$

Accordingly, a equalized data chip Dr' is determined using Formula (7) below using Fourier transformed data chip Dr.

$$D_r' = \frac{(H_{est}'')^*}{|H_{est}''|^2 + (\Sigma')^2} D_r \qquad (7)$$

In Formula (7), $(H_{est}'')^*$ represents a complex conjugate signal of $(H_{est}'')$.

By then performing an inverse Fourier transformation on the equalized data chip Dr', frequency domain equalized received data chips can be obtained.

Specifically, in FIG. 5, if a received signal is input into an FDE, firstly, the unique word of the received signal is performed by Fourier transformation in a Fourier transformation section (FFT) 201. In a calculation section 202, it is calculated together with the complex conjugate signal $U_t^*$ shown in Formula (3) above, and the estimated channel $H_{est}$ is obtained. The estimated channel $H_{est}$ output by the calculation section 202 is performed by an inverse Fourier transformation in the inverse Fourier transformation section (Inverse FFT) 203, and a delay profile $h_{est}$ is obtained. Note that the calculated delay profile $h_{est}$ that is used as information that shows the quality of the received signal.

The delay profile $h_{est}$ is input into a CP filter 204 and, using processing on the time domain based on the above Formula (4), filtering is performed using the filter $h_{Filter}$ that extracts only components within the cyclic prefix, and a delay profile $h_{est}'$ from which noise has been removed is obtained. In addition, by inputting this into a zero padding 205 and, as described above, by padding the interpolation area of the delay profile $h_{est}'$ with zeros, a signal $h_{est}''$ is obtained. By performing a Fourier transformation on the obtained $h_{est}''$ in a Fourier transformation processing section (FFT) 206 interpolated estimated channel $H_{est}''$ is obtained.

The interpolated estimated channel $H_{est}''$ is then input into a noise power density computation unit 207 and an MMSE equalization unit 208.

In the noise power density computation unit 207, in order to perform MMSE frequency domain equalization, the noise power of the estimated channel $H_{est}''$ computed based on the above Formulas (5) and (6), and the noise power density is input into the MMSE equalization unit 208.

In the MMSE equalization unit 208, a received data chip Dr' whose deterioration through multipath channel has been compensated using the interpolated estimated channel $H_{est}''$ and the noise power density of the interpolated estimated channel $H_{est}''$ is calculated from the received data that is performed by a Fourier transformation in the Fourier transformation processing section (FFT) 208 based on the above Formula (7). The received data chip Dr' whose deterioration through multipath channel has been compensated that is output by the MMSE equalization unit 208 is performed by an inverse Fourier transformation in the inverse Fourier transformation processing section (Inverse FFT) 210, and is output from the FDE as a frequency domain equalized received data chip.

(Operation of the Transmitter and Receiver of the Present Embodiment)

An operation of a base station provided with the transmitter of the present embodiment and of a mobile unit provided with the receiver of the present embodiment will be described with reference made to FIGS. 1 and 2.

Firstly, in the modulator 1 of the base station, a transmitted signal is created by modulating information (Rake or FDE) relating to the frame format used in the subsequent transmission and modulating the decision as to whether or not code division multiplexing based on Walsh code is present and also the number of Walsh multiplex, which are decided by the decision circuit 13.

Note that, in the description given below, the term "transmission information" is used and this includes both "information relating to the frame format" and "whether or not code division multiplexing based on Walsh code is present and also the number of Walsh multiplex". In addition, the transmission information used in a subsequent transmission is referred to as "subsequent transmission information", while the transmission information used in the current transmission is referred to as "current transmission information".

The Walsh multiplexer 2 performs code division multiplexing on output signals from the modulator 1 based on "whether or not code division multiplexing based on Walsh code is present and also the number of Walsh multiplex" of the "current transmission information". The transmission selection switch 3 changes its switching based on the "information relating to the frame format" of the "current transmission information", and inputs transmitted signals output from the Walsh multiplexer 2 based into either the unique word insertion unit 4 or the pilot insertion unit 7.

As a result, the base station transmits to the mobile unit from the transmission antenna 6 frames formed using either a frame format for Rake reception or a frame format for FDE that have been code division multiplexed using Walsh code based on the "current transmission information". After this transmission, the "current transmission information" is updated using the "subsequent transmission information".

On the other hand, in the reception selection switch 22 of the mobile unit, the switch is changed based on the "information relating to the frame format" of the "current transmission information" instructed by the base station, and received signals from the receiving antenna 21 are input into either the cyclic prefix removal unit 23 or the Rake receiver 25. As a result, one of either FDE or Rake reception is executed.

In the Walsh demultiplexer 26, data that has been code division multiplexed using Walsh code is disassembled based on "whether or not code division multiplexing based on Walsh code is present and also the number of Walsh multiplex" of the "current transmission information", while in the demodulator 27 the "subsequent transmission information" that was transmitted from the base station together with the data is demodulated. After this demodulation, the "current transmission information" is updated using the "subsequent transmission information".

The demodulator 28 of the mobile unit modulates the transmitted binary data together with the delay profile measured in the FDE 24, the CIR measured in the rake receiver 25, and the bit error rate (for example, the desired BER) of the received signals that is required in the mobile unit. The demodulator then transmits these from the transmission antenna 32 to the base station via the Walsh multiplexer 29, the pilot insertion unit 30, and the complex scrambling unit 31.

Note that, in the description given below, the measured delay profiles and CIR are grouped together under the term "reception quality". Furthermore, this "reception quality" and the bit error rate (the desired BER) of the received signals that is required in the receiver in the mobile unit are grouped together under the term "quality information".

In the base station and mobile unit provided with the transmitter and receiver of the present embodiment, it is necessary that down link transmission from the base station to the mobile unit is synchronized and is time division multiplexed for each mobile unit. Accordingly, even if communication is performed using one of the frame format for Rake reception and FDE, it is possible to estimate the delay profile or CIR from the pilot signals (including unique words) used in transmission from the base station to other mobile units.

In the base station, signals from the receiving antenna 9 are received via the rake receiver 10 and the Walsh demultiplexer 11, and the "quality information" transmitted from the mobile unit is demodulated together with the data in the demodulator 12. In the mapping circuit of the decision circuit 13, the most appropriate "transmission information" is decided from the three sets of information contained in the "quality information", namely, the delay profile and CIR measured in the mobile unit and the bit error rate (the desired BER) of the received signals that is required in the receiver in the mobile unit, and the "subsequent transmission information" is updated using the "transmission information" decided by the decision circuit 13.

As has been described above, according to the transmitter and receiver of the present embodiment, notification about a reception quality that includes delay profiles and CIR measured from the received signals in the FDE 24 or Rake receiver 25 is given to the transmitter together with the bit error rate (the desired BER) of the received signals that is required in the receiver.

On the receiver, based on the reception quality that includes the delay profile and CIR that are included in the notified quality information, the number of code division multiplex and frame format are decided in the decision circuit 13 such that bit error rate of a received signal which is required on the receiver side, is obtained. The transmission selection switch 3 then selects one of the either the unique word insertion unit 4 and the cyclic prefix insertion unit 5 that create a frame format for FDE or the pilot insertion unit 7 and the complex scrambling unit 8 that create a frame format for Rake reception, and data is then transmitted.

Accordingly, in the transmission and reception of data that demands a high throughput, if the number of code division multiplex whose characteristics using FDE are superior than using Rake reception is required when the data is converted into a number of code division multiplex, by performing the reception using FDE without performing code division multiplexing, the reception quality is improved compared with Rake reception. On the other hand, in the transmission and reception of data that requires high quality information transmission even at low data rate, by performing Rake reception on signals that have been appropriately code division multiplexed (for example, when the number of Walsh multiplex is 4 or less), it is possible to improve the reception quality compared with FDE. Consequently, the effect is obtained that it is possible to construct a communication system that is capable of dealing with a variety of transmission conditions that are demanded and of providing a communication quality that is satisfactory in all types of communication environments.

Moreover, particularly in the present embodiment, if the decision as to a number of code division multiplex and frame format that provide a bit error rate of received signal is made on the transmitter side instead of, for example, the receiver on the mobile unit that is provided with the receiver of the present embodiment can be simplified, and the size of the mobile unit can be reduced.

Second Embodiment

The transmitter and receiver of the second embodiment of the present invention will be described.

Figure 8:
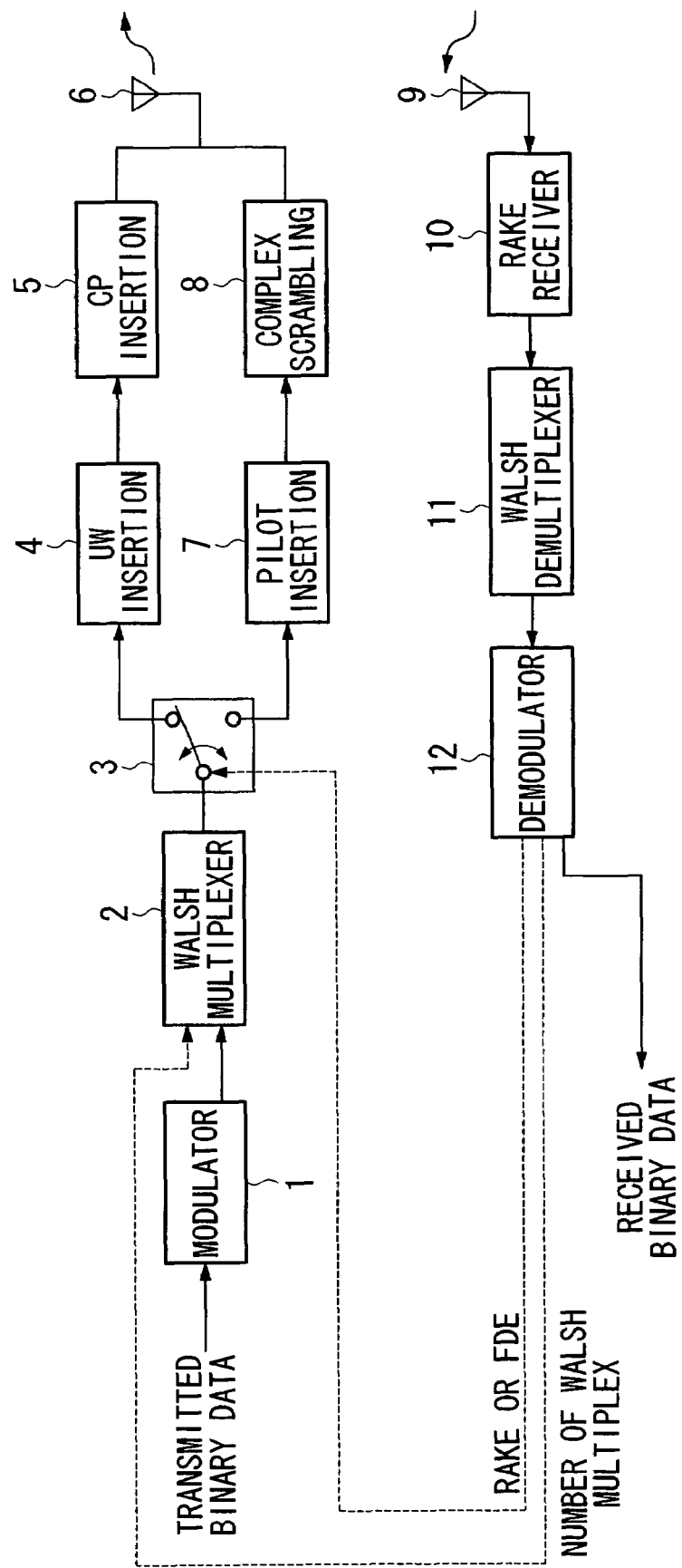
FIG. 8 is a block diagram showing the structure of a base station provided with the transmitter of the second embodiment of the present invention.
Figure 9:
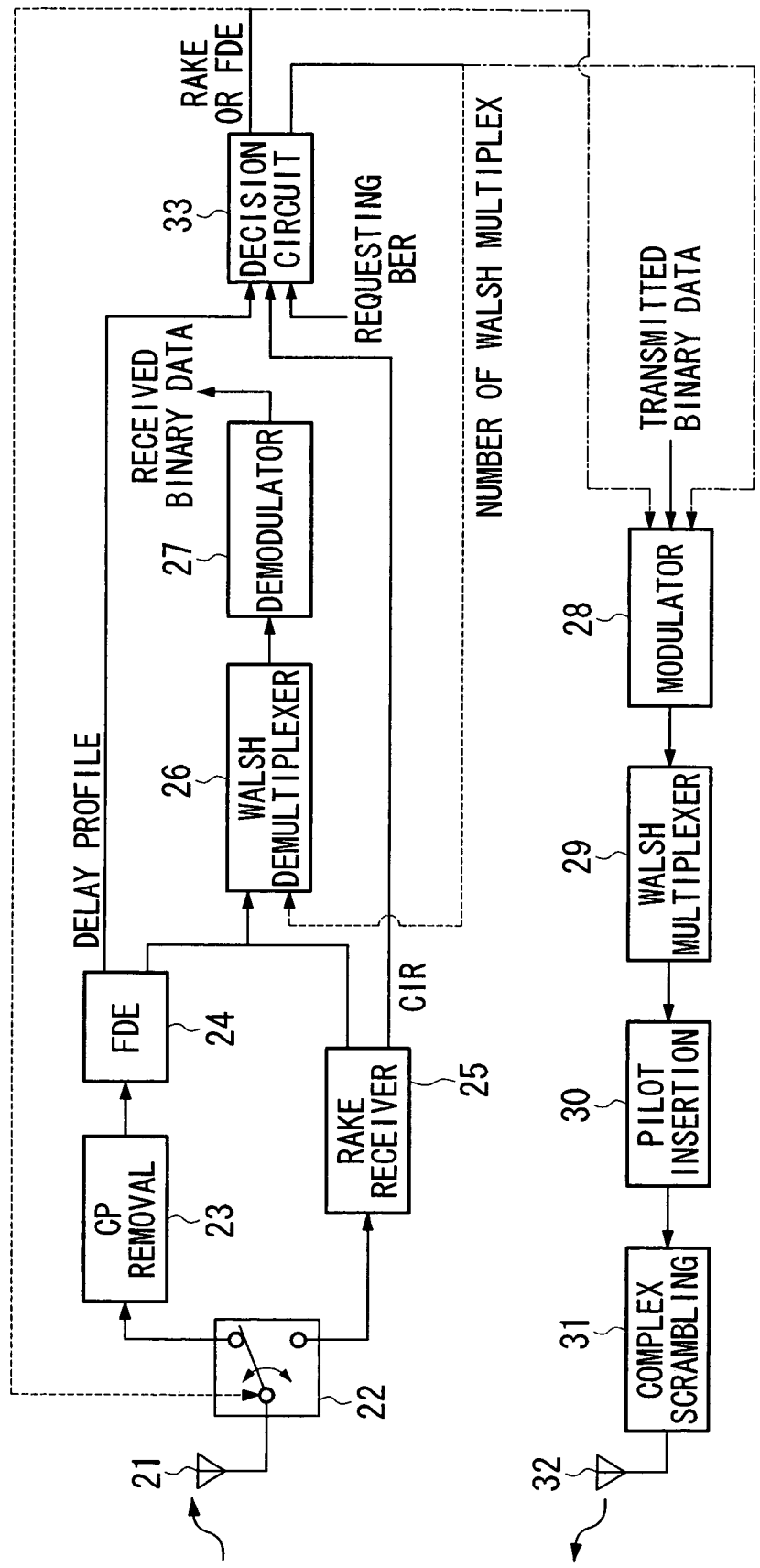
FIG. 9 is a block diagram showing the structure of a base station provided with the receiver of the second embodiment of the present invention.

FIGS. 8 and 9 are block diagrams showing the application of the transmitter and receiver of the second embodiment of the present invention to down link communication from a base station to a mobile unit. FIG. 8 is a block diagram showing the structure of a base station provided with the transmitter of the present embodiment, while FIG. 9 is a block diagram showing the structure of a mobile unit provided with the receiver of the present embodiment.

The transmitter and receiver of the present embodiment differ from the transmitter and receiver described in the first embodiment in that the existence or otherwise of code division multiplexing for signals transmitted by the transmitter and also the number of Walsh multiplex are decided by a mapping circuit using the reception quality that includes a delay profile and CIR measured on the receiver from the received signals, and using the bit error rate (the desired BER) of the received signals that is required in the receiver. In addition, the decision circuit that decides information relating to the frame format based on the existence or otherwise of code division multiplexing for signals transmitted by the transmitter and also the number of Walsh multiplex is provided in the transmitter side in the first embodiment, while in the second embodiment it is provided on the receiver.

Accordingly, only the differences between the transmitter and receiver of the first embodiment and the transmitter and receiver of the second embodiment will be described. Furthermore, in FIGS. 8 and 9, components that are given the same descriptions as components forming the transmitter and receiver of the first embodiment shown in FIGS. 1 and 2 perform the same operations as the components forming the transmitter and receiver of the first embodiment and, therefore, a description thereof is omitted here.

The transmitter of the present embodiment will now be described. In a base station provided with the transmitter of the present embodiment, the decision circuit 13 that was provided in the base station provided with the transmitter of the first embodiment has been removed. Accordingly, the existence or otherwise of code division multiplexing in transmitted signals and the number of Walsh multiplex of the Walsh multiplexer 2, and the direction of the transmission selection switch 3, the information relating to the frame format (i.e., Rake or FDE) can be transmitted from the receiver side, and received via the antenna 9 by the rake receiver 10 and the Walsh demultiplexer 11. In addition, the Walsh multiplexer 2 and the transmission selection switch 3 are controlled based on information demodulated in the demodulator 12.

The receiver of the present embodiment will now be described. The mobile unit having the receiver of the present embodiment is provided with a decision circuit 33 that is the decision circuit 13 provided in the base station having the transmitter of the first embodiment. Accordingly, the decision circuit 33 decides the existence or otherwise of code division multiplexing for transmitted signals and also the number of Walsh multiplex using a mapping circuit using delay profiles of received signals measured by the FDE 24, CIR of the received signals measured by the rake receiver 25, and using the bit error rate of the received signals that is required in the receiver. In addition, the decision circuit 33 decides the direction of the reception selection switch 22, information relating to the frame format (i.e., Rake or FDE) based on the existence or otherwise of code division multiplexing for transmitted signals and also the number of Walsh multiplex that are decided.

When the information relating to the frame format that is decided in the decision circuit 33 shows reception using FDE, the direction of the reception selection switch 22 is set to the cyclic prefix removal unit 23 side. If, however, the information shows Rake reception, the direction of the reception selection switch 22 is set to the Rake receiver 10 side. Moreover, the Walsh demultiplexer 26 disassembles the code division multiplexing based on the existence or otherwise of code division multiplexing and also the number of Walsh multiplex that are decided in the decision circuit 33 and extracts signals therefrom.

In contrast, after the existence or otherwise of code division multiplexing and also the number of Walsh multiplex, and the information relating to the frame format that are decided in the decision circuit 33 have been modulated on a carrier in the modulator 28 together with the transmitted binary data sent from the mobile unit to the base station, they are transmitted from the antenna 32 to the base station via the Walsh multiplexer 29, the pilot insertion unit 30, and the complex scrambling unit 31.

Note that the method of deciding the existence or otherwise of code division multiplexing and also the number of Walsh multiplex, and the information relating to the frame format that are decided in the decision circuit 33 is the same method that is used by the decision circuit 13 and a description thereof is therefore omitted.

(Operation of the Transmitter and Receiver of the Present Embodiment)

An operation of a base station provided with the transmitter of the present embodiment and of a mobile unit provided with the receiver of the present embodiment will be described with reference made to FIGS. 8 and 9.

In the same way as in the first embodiment, in the description given below, the term "transmission information" is used to refer to both "information relating to the frame format" and "the existence or otherwise of code division multiplexing based on Walsh code and also the number of Walsh multiplex". In addition, transmission information used in the subsequent transmission is referred to as "subsequent transmission information", while the transmission information used in the current transmission is referred to as "current transmission information".

Firstly, the modulator 1 of the base station modulates transmitted binary data and creates a transmitted signal. The Walsh multiplexer 2 performs code division multiplexing on output signals from the modulator 1 based on "the existence or otherwise of code division multiplexing based on Walsh code and also the number of Walsh multiplex" of the "current transmission information". The transmission selection switch 3 changes its switching based on the "information relating to the frame format" of the "current transmission information", and inputs transmitted signals output from the Walsh multiplexer 2 based into either the unique word insertion unit 4 or the pilot insertion unit 7.

As a result, the base station transmits to the mobile unit from the transmission antenna 6 using either a frame format for Rake reception or a frame format for FDE that have been code division multiplexed using Walsh code based on the "current transmission information".

On the other hand, in the reception selection switch 22 of the mobile unit, the switch is changed based on the "information relating to the frame format" of the "current transmission information", and received signals from the reception antenna 21 are input into either the cyclic prefix removal unit 23 or the Rake receiver 25. As a result, one of either FDE or Rake reception is executed.

In the Walsh demultiplexer 26, data that has been code division multiplexed using Walsh code is disassembled based on "the existence or otherwise of code division multiplexing based on Walsh code and also the number of Walsh multiplex" of the "current transmission information", while in the demodulator 27 the "subsequent transmission information" that was transmitted from the base station together with the data is demodulated. The delay profile is measured in the FDE 24 the CIR is measured in the Rake receiver 25. Note that in the description given below, in the same way as in the first embodiment, the measured delay profiles and CIR are grouped together the term "reception quality". Furthermore, this "reception quality" and the bit error rate (the desired BER) of the received signals that is required in the receiver in the mobile unit are grouped together the term "quality information".

On the other hand, in the mapping circuit of the decision circuit 33 the most appropriate "transmission information" is decided from the three sets of information contained in the "quality information", namely, the delay profile and CIR measured in the mobile unit and the bit error rate (the desired BER) of the received signals that is required in the receiver in the mobile unit, and the "current transmission information" is updated using the "subsequent transmission information" decided by the decision circuit 33.

Note that, in the base station and mobile unit provided with the transmitter and receiver of the present embodiment, in the same way as in the first embodiment, even if communication is performed using one of the frame format for Rake reception and the frame format for FDE, it is possible to estimate the delay profile or CIR from the pilot signals (including unique words) used in time division multiplexed transmission from the base station to other mobile units.

The modulator 28 in the mobile unit modulates the "subsequent transmission information" decided by the decision circuit 33 together with the transmitted binary data, and outputs these to the base station from the transmission antenna 32 via the Walsh multiplexer 29, the pilot insertion unit 30, and the complex scrambling unit 31.

On the other hand, in the base station, signals received from the reception antenna 9 are received via the Rake receiver 10 and the Walsh demultiplexer 11, and the "subsequent transmission information" transmitted from the mobile unit is demodulated together with the data in the demodulator 12. The "current transmission information" is then updated using the demodulated "subsequent transmission information".

As has been described above, according to the transmitter and receiver of the present embodiment, on the receiver side, the number of code division multiplex and frame format are decided in the decision circuit 33 such that a bit error rate of received signal, which is required on the receiver, is obtained from the reception quality that includes the delay profile and CIR that were measured from the received signals in the FDE 24 and Rake receiver 25, and from the quality information that includes the bit error rate (i.e., the desired BER) of the received signals that is required in the receiver, and the number of code division multiplex and frame format are notified to the transmitter.

On the receiver, based on the number of code division multiplex and frame format that have been notified, one of the either the unique word insertion unit 4 and the cyclic prefix insertion unit 5 that create a frame format for FDE or the pilot insertion unit 7 and the complex scrambling unit 8 that create a frame format for Rake reception is selected by the transmission selection switch 3.

Accordingly, in the same way as in the first embodiment, in the transmission and reception of data that demands a high throughput, by performing the reception using FDE without code division multiplexing, the reception quality is improved compared with Rake reception. On the other hand, by performing Rake reception in the transmission and reception of data that requires high quality information transmission even at low data rate, it is possible to improve the reception quality compared with FDE. Consequently, the effect is obtained that it is possible to construct a communication system that is capable of dealing with a variety of transmission conditions that are demanded and of providing a communication quality that is satisfactory in all types of communication environments.

Moreover, particularly in the present embodiment, if the decision as to a number of code division multiplex and frame format that provide an error bit rate of received signal that is required on the receiver is made on the transmitter, then the procedure of notification of the quality information from the receiver to the transmitter can be omitted, and the effect is also achieved that it is possible to more quickly share the number of code division multiplex and frame format decided between the transmitter and receiver, and these can be switched in a short time to correspond to the communication environment.

Note that in the above described first and second embodiments, a description is given of when the present invention is applied to down link transmission from a base station to a mobile unit, however, for up link transmission when information is transmitted from the mobile unit to the base station, it is also possible to use FDE instead of Rake reception or to apply the present invention. Moreover, any communication method may be used provided that the communication method reliably enables information to be transmitted from a mobile unit to a base station,.

Furthermore, in the above described first and second embodiments, an example is described in which notification of a number of code division multiplex and frame format that have been decided from quality information that includes the reception quality, which includes the delay profile and CIR measured from the received signals, and from the bit error rate (the desired BER) of the received signals that is required in the receiver is given from a transmitter to a receiver or from a receiver to a transmitter. However, if the quality information can be shared by both, then it is also possible to provide the same decision circuit in both the transmitter and receiver and for each decision circuit to decide the number of code division multiplex and the frame format from the quality information.

By employing this type of structure, the procedure of notification of the decided code number of code division multiplex and frame format from the receiver to the transmitter can be omitted, and the effect is also achieved that it is possible to more quickly share the number of code division multiplex and frame format decided between the transmitter and receiver, and that these can be switched in a short time to correspond to the communication environment.

As has been described above, according to the present invention, using one of a first transmission device that transmits signals using a frame format for FDE and a second transmission device that transmits signals using a frame format for Rake reception, the signals are transmitted using the optimum frame format such that a communication quality that satisfies a variety of required transmission conditions on the receiver can be obtained. In addition, it is possible in the receiver, to reliably receive the transmitted signals using either FDE or a Rake receiver in accordance with the transmitted frame format.

Accordingly, by transmitting information by switching between a format in which communication is performed using FDE, which enables high throughput to be achieved, and a format in which communication is performed using Rake reception, which makes high quality information transmission possible even at low data rates, based on the required transmission conditions, the effect is achieved that it is possible to construct a communication system that can deal with a variety of demanded transmission conditions, and can provide a satisfactory communication quality in various types of communication environment.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A transmitter that transmits a signal to a receiver, comprising:

a first transmitting means that transmits the signal using a frame format that is formed by a first pilot signal in which an end portion of a known signal that has been matched in advance with the receiver is reproduced at a front of the first known signal, and by first transmitted binary data in which an end portion of the data is reproduced at a front of the data;

a second transmitting means that transmits the signal using a frame format formed by a second pilot signal formed by a second known signal that has been matched in advance with the receiver, and by second transmitted binary data;

a selection means that selects one of the first transmitting means and the second transmitting means when the signal is transmitted;

a quality information sharing means that shares quality information that relates to the quality of the transmitted signal with the receiver; and a multiplex number deciding means that decides from the quality information shared with the receiver whether or not code division multiplexing is present for the transmitted signal and also decides a number of Walsh multiplex, wherein the selection means selects one of the first transmitting means and the second transmitting means using control information created in accordance with the decision as to whether or not code division multiplexing is present for the transmitted signal and also the number of Walsh multiplex.

2. The transmitter according to claim 1, further comprising a format information sharing means that shares information relating to the frame format of the signal with the receiver,
wherein, based on the information relating to the frame format that is shared with the receiver, the selection means selects one of the first transmitting means and the second transmitting means.

3. The transmitter according to claim 1, wherein the transmitter is provided with a format information sharing means that shares, with the receiver, information concerning the frame format relating to the one of the first transmission means and the second transmission means that is selected.

4. The transmitter according to claim 1, wherein the first pilot signal is formed by constant amplitude zero auto-correlation (CAZAC) sequence signal.

5. The transmitter according to claim 1, wherein the quality information comprises:
a bit error rate of a received signal that is required in the receiver;
a delay profile of the received signal that is estimated in the receiver using the first pilot signal, and
a carrier to interference power ratio of the received signal that is estimated in the receiver using the second pilot signal.

6. A receiver that receives a signal from a transmitter, comprising:
a first receiving means that receives the signal by operating a frequency domain equalizer (FDE);
a second receiving means that performs Rake reception of the signal;
a selection means that selects one of the first receiving means and the second receiving means;
a quality measuring means that measures the quality of a received signal;
a multiplex number deciding means that decides whether or not code division multiplexing is present for a transmitted signal and also decides a number of Walsh multiplex from quality information relating to the quality of the signal; and
a format information sharing means that shares information relating to the frame format with the transmitter,
wherein the selection means selects one of the first receiving means and the second receiving means using control information created in accordance with the decision as to whether or not code division multiplexing is present for the transmitted signal and also the number of Walsh multiplex, and
wherein the format information sharing means shares with the transmitter information concerning the frame format that relates to the one of the first transmission means and the second transmission means that is selected.

7. The receiver according to claim 6, further comprising:
a quality measuring means that measures the quality of the received signal;
a quality information sharing means that shares quality information that relates to the quality of the received signal with the transmitter; and
a format information sharing means that shares information relating to the frame format the received signal with the transmitter,
wherein the selection means selects one of the first receiving means and the second receiving means based on information relating to the frame format that is shared with the transmitter.

8. The receiver according to claim 6, further comprising:
a quality measuring means that measures the quality of the received signal;
a multiplex number deciding means that decides whether or not code division multiplexing is present for the received signal and also decides a number of Walsh multiplex from quality information relating to the quality of the received signal; and
a quality information sharing means that shares quality information that relates to the quality of the signal with the transmitter,
wherein the selection means selects one of the first receiving means and the second receiving means using control information created in accordance with the decision as to whether or not code division multiplexing is present for a transmitted signal and also the number of Walsh multiplex.

9. The receiver according to claim 6, wherein the quality measuring means comprises a means that performs delay profile estimation of the received signal using the first pilot signal, and a unit that estimates a carrier to interference power ratio of the received signal using the second pilot signal,
wherein the quality information includes a bit error rate of the received signal that is required during reception, a delay profile that is estimated in the receiver from the received signal, and a carrier to interference power ratio.

* * * * *